Patented May 27, 1941

2,243,219

UNITED STATES PATENT OFFICE 2,243,219

POROUS REFRACTORY AND PROCESS OF MANUFACTURE

John D. Morgan, South Orange, N. J., assignor to Cities Service Oil Company, New York, N. Y., a corporation of Pennsylvania No Drawing. Application June 25, 1938, Serial No. 215,946

3 Claims. (Cl. 106—9)

The present invention relates to the art of manufacturing heat insulating material and more particularly to a new type of improved insulating material and the process of its manufacture.

An object of the invention is the provision of an improved process for the production of a porous refractory insulating material which possesses high strength under compression after firing to moderately high temperatures.

Another object of the invention is the production of an insulating material containing a relatively large percentage of voids and possessing high crushing strength after firing to temperatures in the neighborhood of 1200° F.

Another object of the invention is the production of light weight insulating shapes having the strength and toughness equal to that of heavier shapes of comparable size.

In accordance with these objects the improved process of the present invention includes the steps of forming a plastic mixture of a refractory aggregate and an acid, digesting the mixture for about one half hour and adding to the digested mixture a solid combustible organic material, small proportions of chromic oxide and ferro-silicon, shaping the mixture into any desired shapes, air-drying the shapes and then subjecting them to low temperature heating followed by high temperature firing.

The improved process of the present invention and the improved product produced thereby can best be understood by the following example from which other objects and advantages will be apparent.

Approximately 1143 parts of milled grain zircon (zirconium silicate) and 1143 parts of grain zircon are combined and mixed. To this mixture there is then added 143 parts of 85% orthophosphoric acid and sufficient water to make a creamy mixture. This zircon orthophosphoric acid mixture is digested for about one half hour at a temperature of about 300° F., after which there is intimately incorporated a wet mixture of 50 parts of chromic oxide (dry), 12 parts of ferro silicon, and 425 parts of ground cork (specific gravity taken as 0.25), the cork consisting of 275 parts of 8 to 22 mesh screen size and 150 parts of 22 to 36 mesh screen size. All materials are referred to in parts by weight.

The resulting mixture is then cast into any desired form or shape and the shapes are air dried at ordinary room temperature for a period of about 24 hours. The air dried shapes are put into a furnace and baked for about 6 hours at 300° F., after which the temperature is gradually raised to 1200° F. over a three-hour period. In this operation chromic oxide and zircon phosphate act as bonding agents for the ingredients of the mass. Most of the cork present in the shapes will be charred and partially burned out, leaving pores or spaces dispersed throughout the shapes. The shapes may be then fired to temperatures of from 2000° to 2600° F., which burns out any remaining particles of cork that might still be present in the mass and completely bonds the refractory particles of the shapes.

While zircon is preferred, other refractory body material may be used instead of the zorcon mentioned in the example above. For example, such materials as silica, magnesia, kaolin, zorconia, clays and the like substances which are capable of resisting high temperatures can be substituted for the zircon with the resultant production of a desirable porous insulating material.

While cork is preferred because of its ability to repel water and retain its form in the aggregate without becoming soggy, other materials such as sawdust, cellulose and suitable organic substances can be used.

The porosity of the finished product is proportional to the proportion of combustible organic material mixed in the aggregate before firing. In any particular instance, the final porosity of the insulating material produced can be reasonably determined by fixing the proportion of organic combustible material used in the aggregate.

While in the particular example given herein, the proportion of organic material used constitutes about 33% by volume of the mix, it is within the scope of the invention to vary the proportion of organic material used, so that it constitutes from 30% to 70% by volume of the mix.

The light weight porous refractory produced according to the invention can be moulded and cast into any desired shape. The refractory can be made in the form of bricks, slabs, sheets or other shapes.

In the specification and claims, the terms "grain zircon" and "milled grain zircon" have the following meaning: Grain zircon is zircon of sufficient fineness to pass through a 160 mesh screen; and milled grain zircon is zircon of sufficient fineness to pass through a 300 mesh screen.

In the claims, unless otherwise stated, it is to be understood that the various materials are referred to in parts by weight and that the cork may have a density of 0.22 to 0.26.

Having thus described the invention in its preferred form, what is claimed as new is:

1. The process of making refractory, which comprises intimately mixing milled grain zircon, and about 6% by weight of the zircon of phosphoric acid and adding water to make a plastic mixture, digesting the mixture at an elevated temperature, mixing with the digested mixture about 2% by weight of chromic oxide, forming the desired shapes from the resulting mixture and air-drying them, heating the shapes to a baking temperature for a substantial period of time, and then gradually heating them to about 1200° F.

2. The process of making refractory, which comprises intimately mixing milled grain zircon, grain zircon, and about 6% by weight of the zircon of phosphoric acid, wetting the mixture to form a plastic mass, digesting the mixture for a short period at an elevated temperature, mixing with the digested mixture about 2% by weight of chromic oxide, and about ½% by weight of ferrosilicon, forming the desired shapes from the resulting mixture and air-drying them, heating the shapes at a baking temperature for a substantial period of time, and gradually heating them to 1200° F.

3. A refractory composition comprising finely ground zircon bonded by the reaction products resulting from the reaction thereon of about 6% by weight of the zircon of phosphoric acid and about 2% by weight of chromic acid.

JOHN D. MORGAN.